(12) United States Patent
Gullapudi et al.

(10) Patent No.: US 12,511,575 B2
(45) Date of Patent: Dec. 30, 2025

(54) ADAPTIVE TRAINING COMPLETION TIME AND STATUS FOR MACHINE LEARNING MODELS

(71) Applicant: SAP SE, Walldorf (DE)

(72) Inventors: Sundeep Gullapudi, Singapore (SG); Anantharaman Ravi, Singapore (SG); Denny Jee King Gee, Singapore (SG); Yi Qing Isaac New, Singapore (SG)

(73) Assignee: SAP SE, Walldorf (DE)

( * ) Notice: Subject to any disclaimer, the term of this patent is extended or adjusted under 35 U.S.C. 154(b) by 1009 days.

(21) Appl. No.: 17/646,889

(22) Filed: Jan. 4, 2022

(65) Prior Publication Data

US 2023/0229961 A1 Jul. 20, 2023

(51) Int. Cl.
*G06N 20/00* (2019.01)
*G06N 3/049* (2023.01)
*G06N 5/01* (2023.01)
*G06F 11/3604* (2025.01)

(52) U.S. Cl.
CPC .......... *G06N 20/00* (2019.01); *G06N 3/049* (2013.01); *G06N 5/01* (2023.01); *G06F 11/3612* (2013.01)

(58) Field of Classification Search
CPC .......... G06N 20/00; G06N 3/049; G06N 5/01; G06F 11/3612
See application file for complete search history.

(56) References Cited

U.S. PATENT DOCUMENTS

| | | | |
|---|---|---|---|
| 10,425,335 B2 | 9/2019 | Bhattacharjee et al. | |
| 11,727,309 B2 * | 8/2023 | Dube | G06N 20/00 706/12 |
| 11,861,362 B1 * | 1/2024 | Zhang | G06F 9/45558 |
| 2018/0260693 A1 | 9/2018 | Dahlmeier et al. | |
| 2019/0156216 A1 * | 5/2019 | Gupta | G06N 3/126 |
| 2020/0151201 A1 * | 5/2020 | Chandrasekhar | G06N 5/04 |
| 2020/0279173 A1 * | 9/2020 | Gupta | G06N 5/025 |
| 2020/0356895 A1 | 11/2020 | Ong et al. | |

(Continued)

OTHER PUBLICATIONS

Dong et al Luo, "Progress Indication for Deep Learning Model Training: A Feasibility Demonstration" May 12, 2020, IEEE, pp. 79811-79843. (Year: 2020).*

(Continued)

*Primary Examiner* — Miranda M Huang
*Assistant Examiner* — Chase P. Hinckley
(74) *Attorney, Agent, or Firm* — Fish & Richardson P.C.

(57) ABSTRACT

Methods, systems, and computer-readable storage media for providing a set of heuristics representative of training data that is to be used to process a ML model through a training pipeline, the training pipeline including multiple phases, determining a set of time estimates by providing the set of heuristics as input to a training heuristics model that provides the set of time estimates as output, each time estimate in the set of time estimates indicating an estimated duration of a respective phase of the training pipeline, receiving, during processing of the ML model through the training pipeline, progress data representative of a progress of processing of the ML model, determining a set of status estimates including a status estimate for each phase of the training pipeline based on the progress data, and transmitting the set of time estimates and the set of status estimates for display.

20 Claims, 7 Drawing Sheets

| 500 | Training | Validation | Testing |
|---|---|---|---|
| Estimated Time | 28 hours | 6 hours | 4 hours |
| Time Elapsed | 27h18m42s | 2h42m17s | 0 |
| Percentage Complete | 100 | 42 | 0 |

(56) References Cited

U.S. PATENT DOCUMENTS

| | | | |
|---|---|---|---|
| 2021/0124611 A1* | 4/2021 | Saillet | G06F 9/4887 |
| 2022/0036232 A1* | 2/2022 | Patel | G06F 8/71 |
| 2022/0051049 A1* | 2/2022 | Wang | G06N 20/10 |
| 2022/0076144 A1* | 3/2022 | Ram | G06N 5/04 |
| 2022/0148561 A1* | 5/2022 | Gupta | G10L 13/08 |
| 2023/0029853 A1* | 2/2023 | Xu | G06F 9/5005 |

OTHER PUBLICATIONS

Gunan "TensorFlow 1.13.1" Feb. 25, 2019, GitHub release notes, pp. 1-7. (Year: 2019).*

Wikipedia, "TensorFlow" Dec. 20, 2021, pp. 1-11. (Year: 2021).*

Yang et al., "Efficient AutoML Pipeline Search with Matrix and Tensor Factorization" Jun. 7, 2020, arXiv: 2006.04216v1, pp. 1-20. (Year: 2020).*

Mohr et al., "Predicting Machine Learning Pipeline Runtimes in the Context of Automated Machine Learning" Aug. 4, 2021, IEEE, pp. 3055-3066. (Year: 2021).*

Yang et al., "AutoML Pipeline Selection: Efficiently Navigating the Combinatorial Space" Aug. 2020, pp. 1446-1456. (Year: 2020).*

Yu et al., "Habitat: A Runtime-Based Computational Performance Predictor for Deep Neural Network Training" Jul. 2021, pp. 503-521. (Year: 2021).*

Dube et al., "AI Gauge: Runtime Estimation for Deep Learning in the Cloud" Dec. 5, 2019, IEEE, pp. 160-167. (Year: 2019).*

Toubiana et Lerner, "Two hours later and still running? How to keep your sklearn. fit under control" Mar. 13, 2019, pp. 1-12. (Year: 2019).*

U.S. Appl. No. 17/008,808, Juay et al., filed Sep. 1, 2020.

U.S. Appl. No. 17/203,921, Biswas et al., filed Mar. 17, 2021.

* cited by examiner

FIG. 5A

| Estimated Time | Training | Validation | Testing |
|---|---|---|---|
| Estimated Time | 28h | 6h | 4h |
| Time Elapsed | 0 | 0 | 0 |
| Percentage Complete | 0 | 0 | 0 |

FIG. 5B

| | Training | Validation | Testing |
|---|---|---|---|
| Estimated Time | 28 hours | 6 hours | 4 hours |
| Time Elapsed | 27h18m42s | 2h42m17s | 0 |
| Percentage Complete | 100 | 42 | 0 |

FIG. 5C

| | Training | Validation | Testing |
|---|---|---|---|
| Estimated Time | 28 hours | 6 hours | 4 hours |
| Time Elapsed | 27h18m42s | 6h12m33s | 1h32m37s |
| Percentage Complete | 100 | 100 | 40 |

ADAPTIVE TRAINING COMPLETION TIME AND STATUS FOR MACHINE LEARNING MODELS

BACKGROUND

Enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using machine learning (ML) systems. For example, one or more ML models are each trained to perform some task based on training data. Trained ML models are tested and eventual deployed for production use, each receiving input (e.g., a computer-readable document) and providing output (e.g., classification of the computer-readable document) in execution of a task (e.g., document classification task). ML systems can be used in a variety of problem spaces. An example problem space includes autonomous systems that are tasked with matching items of one entity to items of another entity. Examples include, without limitation, matching questions to answers, people to products, bank statements to invoices, and bank statements to customer accounts.

In many instances, software vendors provide the software systems that use the ML models. In such instances, the software vendors execute training and testing of the ML models for enterprises (e.g., customers of the software vendor). However, operations of an enterprise can depend on availability of trained and tested ML models. To this end, enterprises frequently inquire about the training time and status of ML models, while the ML models are being processed through a training pipeline. For example, depending on a complexity of a ML model and/or an amount of training data that is to be used to train the ML model, completion of the training pipeline for the ML model can take hours, days, or even weeks.

Traditional approaches in informing enterprises of training and status of ML models as they are processed through the training pipeline have several disadvantages. In one traditional approach, an information technology (IT) ticketing system is used that enables enterprises to submit IT tickets requesting an update on the training time and status. Such IT ticketing systems, however, operate as separate systems. Consequently, IT tickets are resolved by the software vendor receiving an IT ticket, investigating a progress of the ML model through the training pipeline, and providing information in response to the IT ticket. This is a time-consuming and resource-intensive process. For example, each submission of an IT ticket and response thereto consumes technical resources (e.g., processors, memory, bandwidth). Further, information available through traditional systems is high-level and is not beneficial in addressing enterprise requests. For example, information available through traditional systems can include status identifiers of in-progress, completed, and failed.

SUMMARY

Implementations of the present disclosure are directed to adaptively providing training completion time and status information. More particularly, implementations of the present disclosure are directed to a training progress platform that provides training completion time and status information based on heuristics of a to-be-executed training job and historical training jobs.

In some implementations, actions include providing a set of heuristics representative of training data that is to be used to process a ML model through a training pipeline, the training pipeline including multiple phases, determining a set of time estimates by providing the set of heuristics as input to a training heuristics model that provides the set of time estimates as output, each time estimate in the set of time estimates indicating an estimated duration of a respective phase of the training pipeline, receiving, during processing of the ML model through the training pipeline, progress data representative of a progress of processing of the ML model, determining a set of status estimates including a status estimate for each phase of the training pipeline based on the progress data, and transmitting the set of time estimates and the set of status estimates for display. Other implementations of this aspect include corresponding systems, apparatus, and computer programs, configured to perform the actions of the methods, encoded on computer storage devices.

These and other implementations can each optionally include one or more of the following features: determining a set of status estimates at least partially includes calculating a training status estimate as a product of an epoch increment counter and a number of executed epochs, the epoch increment counter being provided based on a number of epochs to be executed during a training phase of the training pipeline; determining a set of status estimates at least partially includes calculating a validation status estimate as a product of a validation increment counter and a number of processed records, the validation increment counter being provided based on a number of records to be processed during a validation phase of the training pipeline; determining a set of status estimates at least partially includes calculating a testing status estimate as a product of a testing increment counter and a number of processed records, the testing increment counter being provided based on a number of records to be processed during a testing phase of the training pipeline; providing a set of heuristics includes one or more of determining a number of numerical features in the training data, determining a number of categorical features in the training data, determining a number of textual features in the training data, determining an average value of numerical features in the training data, determining a number of unique categories in the training data, determining an average length of text in the training data, determining a number of unique tokens in text of the training data, determining a number of records in the training data, determining a number of records in a training sub-set of the training data, determining a number of records in a validation sub-set of the training data, and determining a number of records in a testing sub-set of the training data; the training heuristics model is agnostic to the ML model; and the training heuristics model includes a polynomial regression model that is generated based on historical data including sets of heuristics and respective sets of estimated training times.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 5A-5C depict portions of an example dashboard in accordance with implementations of the present disclosure.

Like reference symbols in the various drawings indicate like elements.

DETAILED DESCRIPTION

Figure 1:
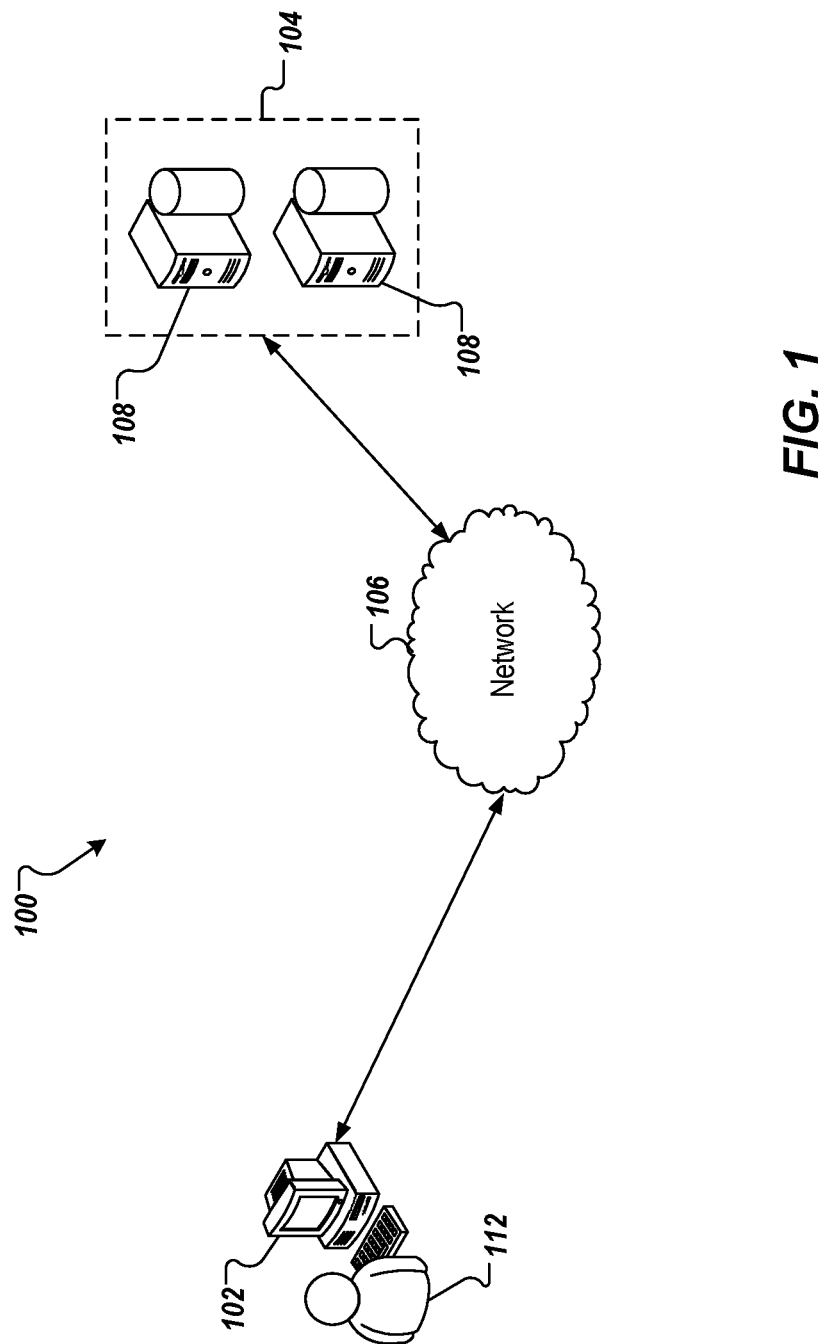
FIG. 1 depicts an example architecture that can be used to execute implementations of the present disclosure.

Implementations of the present disclosure are directed to adaptively providing training completion time and status information. More particularly, implementations of the present disclosure are directed to a training progress platform that provides training completion time and status information based on heuristics of a to-be-executed training job and historical training jobs.

Implementations can include actions of providing a set of heuristics representative of training data that is to be used to process a ML model through a training pipeline, the training pipeline including multiple phases, determining a set of time estimates by providing the set of heuristics as input to a training heuristics model that provides the set of time estimates as output, each time estimate in the set of time estimates indicating an estimated duration of a respective phase of the training pipeline, receiving, during processing of the ML model through the training pipeline, progress data representative of a progress of processing of the ML model, determining a set of status estimates including a status estimate for each phase of the training pipeline based on the progress data, and transmitting the set of time estimates and the set of status estimates for display.

Implementations of the present disclosure are described in further detail with reference to an example problem space that includes the domain of finance and matching bank statements to invoices. More particularly, implementations of the present disclosure are described with reference to the problem of, given a bank statement (e.g., a computer-readable electronic document recording data representative of one or more bank statements), enabling an autonomous system to determine one or more invoices (e.g., computer-readable electronic documents respectively recording data representative of an invoice) that are represented in the bank statement using a ML model. It is contemplated, however, that implementations of the present disclosure can be realized in any appropriate problem space.

Implementations of the present disclosure are also described in further detail herein with reference to an example application that leverages one or more ML models to provide functionality (referred to herein as a ML application). The example application includes SAP Cash Application (CashApp) provided by SAP SE of Walldorf, Germany. CashApp leverages ML models that are trained using a ML framework (e.g., SAP Leonardo Machine Learning) to learn accounting activities and to capture rich detail of customer and country-specific behavior. An example accounting activity can include matching payments to invoices for clearing of the invoices. For example, using an enterprise platform (e.g., SAP S/4 HANA), incoming payment information (e.g., recorded in computer-readable bank statements) and open invoice information are passed to a matching engine, and, during inference, one or more ML models predict matches between bank statements and invoices. In some examples, matched invoices are either automatically cleared (auto-clearing) or suggested for review by a user (e.g., accounts receivable). Although CashApp is referred to herein for purposes of illustrating implementations of the present disclosure, it is contemplated that implementations of the present disclosure can be realized with any appropriate application that leverages one or more ML models.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an autonomous system that uses a ML model to match entities. That is, the server system 104 can receive computer-readable electronic documents (e.g., bank statements), and can match electronic documents (e.g., a bank statement) to one or more entities (e.g., invoices). In some examples, the server system 104 includes a ML platform that provides and trains a ML model, as described herein.

Figure 2:
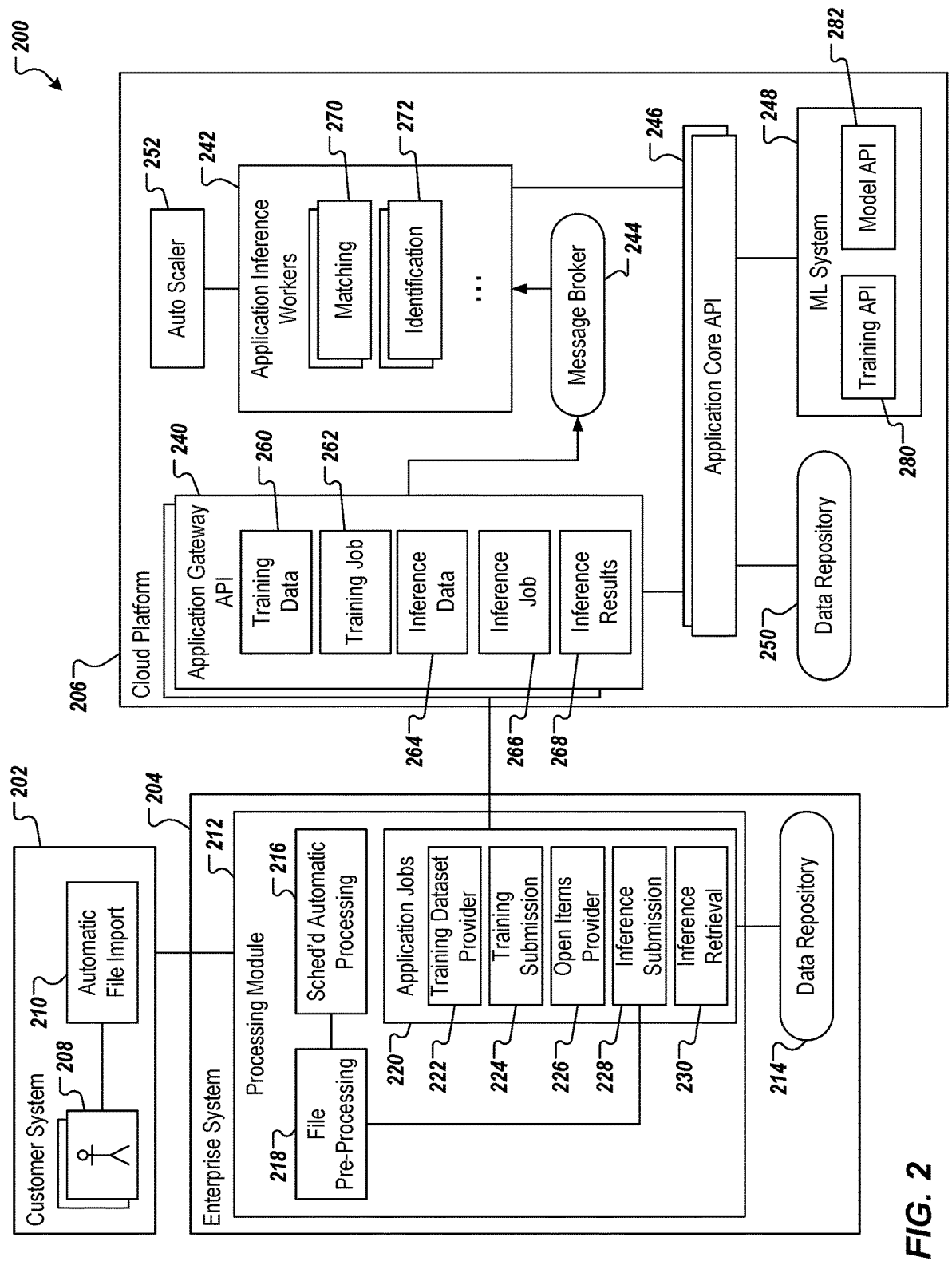
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture 200 includes a customer system 202, an enterprise platform 204 (e.g., SAP S/4 HANA) and a cloud platform 206 (e.g., SAP Cloud Platform (Cloud Foundry)). As described in further detail herein, the enterprise platform 204 and the cloud platform 206 facilitate one or more ML applications that leverage ML models to provide functionality for one or more enterprises. In some examples, each enterprise interacts with the ML application(s) through a respective customer system 202. For purposes of illustration, and without limitation, the conceptual architecture 200 is discussed in further detail with reference to CashApp, introduced above. However, implementations of the present disclosure can be realized with any appropriate ML application.

In the example of FIG. 2, the customer system 202 includes one or more client devices 208 and a file import module 210. In some examples, a user (e.g., an employee of the customer) interacts with a client device 208 to import one or more data files to the enterprise platform 204 for processing by a ML application. For example, and in the context of CashApp, an invoice data file and a bank statement data file can be imported to the enterprise platform 204 from the customer system 202. In some examples, the invoice data file includes data representative of one or more invoices issued by the customer, and the bank statement data file includes data representative of one or more payments received by the customer. As another example, the one or more data files can include training data files that provide customer-specific training data for training of one or more ML models for the customer.

In the example of FIG. 2, the enterprise platform 204 includes a processing module 212 and a data repository 214. In the context of CashApp, the processing module 212 can include a finance—accounts receivable module. The processing module 212 includes a scheduled automatic processing module 216, a file pre-processing module 218, and an applications job module 220. In some examples, the scheduled automatic processing module 216 receives data files from the customer system 202 and schedules the data files for processing in one or more application jobs. The data files are pre-processed by the file pre-processing module 218 for consumption by the processing module 212.

Example application jobs can include, without limitation, training jobs and inference jobs. In some examples, a training job includes training of a ML model using a training file (e.g., that records customer-specific training data). In some examples, an inference job includes using a ML model to provide a prediction, also referred to herein as an inference result. In the context of CashApp, the training data can include invoice to bank statement matches as examples provided by a customer, which training data is used to train a ML model to predict invoice to bank statement matches. Also in the context of CashApp, the data files can include an invoice data file and a bank statement data file that are ingested by a ML model to predict matches between invoices and bank statements in an inference process.

With continued reference to FIG. 2, the application jobs module 220 includes a training dataset provider sub-module 222, a training submission sub-module 224, an open items provider sub-module 226, an inference submission sub-module 228, and an inference retrieval sub-module 230. In some examples, for a training job, the training dataset provider sub-module 222 and the training submission sub-module 224 function to request a training job from and provide training data to the cloud platform 206. In some examples, for an inference job, the training dataset provider sub-module 222 and the training submission sub-module 224 function to request a training job from and provide training data to the cloud platform 206.

In some implementations, the cloud platform 206 hosts at least a portion of the ML application (e.g., CashApp) to execute one or more jobs (e.g., training job, inference job). In the example of FIG. 2, the cloud platform 206 includes one or more application gateway application programming interfaces (APIs) 240, application inference workers 242 (e.g., matching worker 270, identification worker 272), a message broker 244, one or more application core APIs 246, a ML system 248, a data repository 250, and an auto-scaler 252. In some examples, the application gateway API 240 receives job requests from and provides job results to the enterprise system 204 (e.g., over a REST/HTTP [oAuth] connection). For example, the application gateway API 240 can receive training data 260 for a training job 262 that is executed by the ML system 248. As another example, the application gateway API 240 can receive inference data 264 (e.g., invoice data, bank statement data) for an inference job 266 that is executed by the application inference workers 242, which provide inference results 268 (e.g., predictions).

In some examples, the enterprise system 204 can request the training job 262 to train one or more ML models using the training data 262. In response, the application gateway API 240 sends a training request to the ML system 248 through the application core API 246. By way of non-limiting example, the ML system 248 can be provided as SAP Leonardo Machine Learning. In the depicted example, the ML system 248 includes a training API 280 and a model API 282. The ML system 248 trains a ML model using the training data. In some examples, the ML model is accessible for inference jobs through the model API 282.

In some examples, the enterprise system 204 can request the inference job 266 to provide the inference results 268, which includes a set of predictions from one or more ML models. In some examples, the application gateway API 240 sends an inference request, including the inference data 264, to the application inference workers 242 through the message broker 244. An appropriate inference worker of the application inference workers 242 handles the inference request. In the example context of matching invoices to bank statements, the matching worker 270 transmits an inference request to the ML system 248 through the application core API 246. The ML system 248 accesses the appropriate ML model (e.g., the ML model that is specific to the customer and that is used for matching invoices to bank statements), which generates the set of predictions. The set of predictions are provided back to the inference worker (e.g., the matching worker 270) and are provided back to the enterprise system 204 through the application gateway API 240 as the inference results 266. In some examples, the auto-scaler 252 functions to scale the inference workers up/down depending on the number of inference jobs submitted to the cloud platform 206.

To provide further context for implementations of the present disclosure, and as introduced above, software vendors often provide software systems that use the ML models. A non-limiting example includes CashApp, introduced above. In such instances, the software vendors execute training and testing of the ML models for enterprises (e.g., customers of the software vendor). For example, and as discussed above with reference to FIG. 2, the enterprise system 204 can request the training job 262 to train one or more ML models using the training data 262. In response, the ML system 248 is prompted to begin training a ML model using the training data.

However, operations of an enterprise can depend on availability of trained and tested ML models. To this end, enterprises frequently inquire about the training time and status of ML models, while the ML models are being processed through a training pipeline. For example, depending on a complexity of a ML model and/or an amount of training data that is to be used to train the ML model, completion of the training pipeline for the ML model can take hours, days, or even weeks.

Information available through traditional systems, however, is high-level and is not beneficial in addressing enterprise requests. For example, information available through traditional systems can include status identifiers of in-progress, completed, and failed. In some examples, traditional systems determine the status of ML training based on a status of the computing resources that are assigned to execute the training. For example, ML models are often trained in cloud computing systems, in which containers are activated (e.g., a pod that is spun-up in the Kubernetes container orchestration system) and within which training is executed. In some examples, at completion of the training, the container is deactivated. If a container is still active, the status of training of the ML model is set to in-progress. If the container is not active, the status of training of the ML model is set to completed. In some examples, if in-progress, a time to completion is wholly absent.

Further, traditional approaches in informing enterprises of training and status of ML models as they are processed through the training pipeline have several disadvantages. In one traditional approach, an information technology (IT) ticketing system is used that enables enterprises to submit IT tickets requesting an update on the training time and status. An example IT ticketing system includes ServiceNow provided by ServiceNow, Inc. Such IT ticketing systems, however, operate as separate systems than that of the training system. Consequently, IT tickets are resolved by the software vendor receiving an IT ticket, investigating a progress of the ML model through the training pipeline, and providing information in response to the IT ticket. This is a time-consuming and resource-intensive process. For example, each submission of an IT ticket and response thereto consumes technical resources (e.g., processors, memory, bandwidth).

In view of the above context, implementations of the present disclosure are directed to adaptively providing training completion time and status information. More particularly, implementations of the present disclosure are directed to a training progress platform that provides training completion time and status information based on heuristics of a to-be-executed training job and historical training jobs. Implementations of the present disclosure achieve multiple technical advantages and improvements over other approaches. For example, implementations of the present disclosure can quickly and resource-efficiently scale to adapt to a number of ML models that are being trained. That is, for example, implementations of the present disclosure obviate the need of a support team and requisite computing resource and hence, are scalable to adapt to any number of ML models being trained. As another example, implementations of the present disclosure, enable other tasks that are dependent on the trained ML models to be time- and resource-efficiently planned and executed. That is, for example, because implementations of the present disclosure provide granular insight into the time and phases of training of a ML model, any tasks that rely on the ML model can be scheduled accordingly.

For purposes of non-limiting illustration, an example ML model is discussed, which can be deployed in the example context introduced above. For example, the ML model is a classifier that is trained to predict matches between entities (entity pairs) to a fixed set of class labels (L). For example, the set of class labels can include 'no match' ($l_0$), 'single match' ($l_1$), and 'multi match' ($l_2$). In some examples, the ML model is provided as a function $f$ that maps a query entity $Q_D$ and a target entity $T_D$ into a vector of probabilities (also called 'confidences' in the deep learning context) for the classes in the set of classes. This can be represented as:

$$f(Q_D, T_D) = \begin{pmatrix} p_0 \\ p_1 \\ p_2 \end{pmatrix}$$

where $p_0$ is a prediction probability of the entity pair $Q_D$, $T_D$ belonging to a first class (e.g., no match), $p_1$ is a prediction probability of the entity pair $Q_D$, $T_D$ belonging to a second class (e.g., single match), and $p_2$ is a prediction probability of the entity pair $Q_D$, $T_D$ belonging to a third class (e.g., multi match).

Here, $p_0$, $p_1$, and $p_2$ can be provided as numerical values indicating a likelihood that the entity pair $Q_D$, $T_D$ belongs to a respective class represented by class labels $l_0$, $lp_1$, and $l_2$. In some examples, the ML model can assign a class label $l_0$, $lp_1$, and $l_2$ to the entity pair $Q_D$, $T_D$ based on the values of $p_0$, $p_1$, and $p_2$. In some examples, the ML model can assign the class label corresponding to the highest value of $p_0$, $p_1$, and $p_2$. For example, for an entity pair $Q_D$, $T_D$, the ML model can provide that $p_0$=0.13, $p_1$=0.98, and $p_2$=0.07. Consequently, the ML model can assign the class label 'single match' ($l_0$) to the entity pair $Q_D$, $T_D$.

In training a ML model, the ML model is processed through a training pipeline, which includes multiple phases. Example phases include a training phase, a validation phase, and a test phase. In some examples, training data is provided and includes known inputs and known outputs. In some examples, the training data is divided into sub-sets, each sub-set being used for a respective phase of the training pipeline. For example, the training data can be divided into a training sub-set, a validation sub-set, and a testing sub-set. In some examples, training data is randomly selected for inclusion in one of the sub-sets. Training data can be conceptually represented as:

| Example Training Data | |
|---|---|
| Input | Output |
| $[Q_{D,1}, T_{D,1}]$ | $l_0$ |
| $[Q_{D,2}, T_{D,2}]$ | $l_2$ |
| $[Q_{D,3}, T_{D,3}]$ | $l_1$ |
| ... | ... |
| $[Q_{D,n}, T_{D,p}]$ | $l_0$ |

In the example of Table 1, for each known input (entity pair $Q_D$, $T_D$) a known output (class label 1) is provided.

Figure 3:
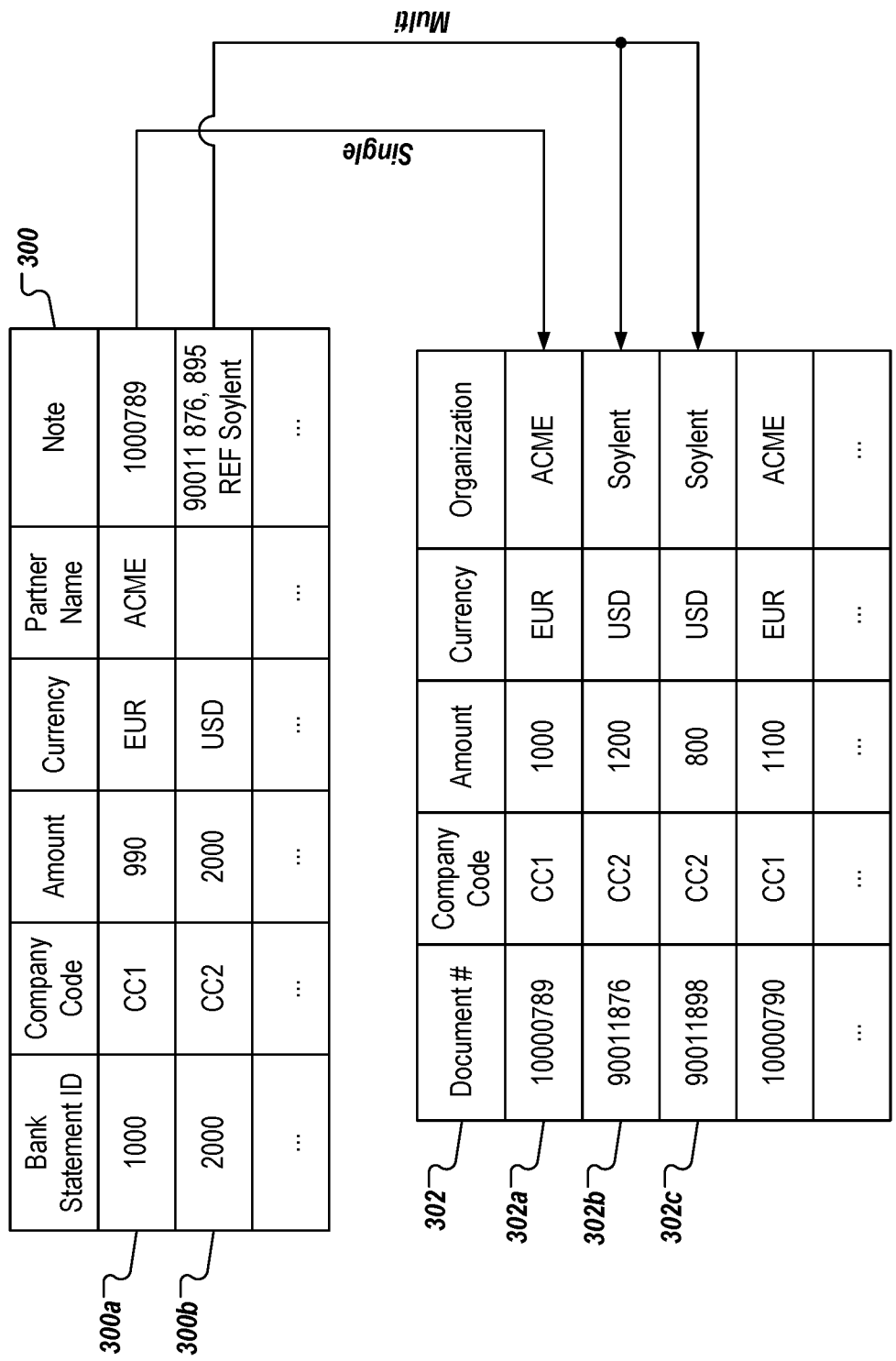
FIG. 3 depicts an example portion of training data.

FIG. 3 depicts an example portion of training data in the example context. In the example of FIG. 3, a first electronic document 300 includes a table that records details of multiple bank statements representing payments received, and a second electronic document 302 includes a table that records details of multiple invoices that had been issued. In the example of FIG. 3, it is shown that a bank statement record 300a is matched to an invoice record 302a as a single match, and that a bank statement record 300b is matched to invoice records 302b, 302c, as a multi match. Accordingly, and in the example context, the ML model is to be trained to match each bank statement record to one or more invoice records.

In the training phase, the ML model is trained on training data in the training sub-set. the ML model is iteratively trained, where, during an iteration, also referred to as epoch, one or more parameters of the ML model are adjusted, and an output is generated based on the training data (e.g., class predictions). For each iteration, a loss value is determined based on a loss function. The loss value represents a degree of accuracy of the output of the ML model. The loss value can be described as a representation of a degree of difference between the output of the ML model and an expected output of the ML model (the expected output being provided from training data). In some examples, if the loss value does not meet an expected value (e.g., is not equal to zero), parameters of the ML model are adjusted in another iteration (epoch) of training. In some examples, the iterative training continues for a pre-defined number of iterations (epochs).

In the validation phase, the (trained) ML model is evaluated using the validation sub-set. For example, the known inputs can be processed through the ML model to generate respective predictions, and the predictions can be compared to the respective known outputs of the validation sub-set to validate the ML model. In general, the validation phase provides an unbiased evaluation of a fit of the ML model on the training sub-set. In some examples, one or more hyperparameters (e.g., high-level hyperparameters) of the ML model can be adjusted during the validation phase.

In the testing phase, the (trained and validated) ML model is tested based on the test sub-set and an accuracy of the ML model can be determined. For example, the known inputs can be processed through the ML model to generate respective predictions, and the predictions can be compared to the respective known outputs of the test sub-set to test the ML model. An accuracy of the ML model can be provided by comparing the number of correct predictions to the total number of predictions performed during the testing phase.

As introduced above, implementations of the present disclosure provide a time estimate for execution of the training pipeline for a ML model. In some implementations, a set of time estimates ($T^{EST}$) is provided and includes a time estimate for each phase of the training pipeline. That is, for example, a training time estimate ($t_{est}^{train}$), a validation time estimate ($t_{est}^{val}$), and a testing time estimate ($test_{est}^{test}$) are provided in the set of time estimates ($T^{EST}$) (e.g., $T^{EST} = \{t_{est}^{train}, t_{est}^{val}, t_{est}^{test}\}$). Implementations of the present disclosure also provide a status estimate for each phase of the training pipeline. In some examples, each status estimate represents a percentage of a respective phase that has been completed, as described in further detail herein.

With regard to the time estimates, a database of historical trainings can record data representative of past training pipelines that have been executed in training respective ML models. In some examples, each training record includes a set of ML model parameters (M), a set of heuristics (H) and a set of actual execution times ($T^{ACT}$). For example, the set of ML model parameters (M) can include parameters $m_1$, $m_2$, ..., $m_n$, each parameter representing an aspect of the ML model trained in a respective training pipeline execution. The set of heuristics (H) can include heuristics $h_1$, $h_2$, ..., $h_k$, each heuristic representing an aspect of the training data used in a respective training pipeline execution. Each set of actual execution times ($T^{ACT}$) can include, for example, an actual training time ($t_{act}^{train}$), an actual validation time ($t_{act}^{val}$), and an actual testing time ($t_{act}^{test}$) of a respective training pipeline execution (e.g., $T^{ACT} = \{t_{act}^{train}, t_{act}^{val}, t_{act}^{test}\}$) For example, the database of historical trainings can be represented as:

TABLE 2

Example Database of Historical Training Pipeline Executions

| Training Pipeline ID | M | H | O $T^{ACT}$ |
|---|---|---|---|
| 1 | $[m_1, m_2, \ldots, m_n]_1$ | $[h_1, h_2, \ldots, h_k]_1$ | $[t_{act}^{train}, t_{act}^{val}, t_{act}^{test}]_1$ |
| 2 | $[m_1, m_2, \ldots, m_n]_2$ | $[h_1, h_2, \ldots, h_k]_2$ | $[t_{act}^{train}, t_{act}^{val}, t_{act}^{test}]_2$ |
| ... | ... | ... | ... |
| p | $[m_1, m_2, \ldots, m_n]_p$ | $[h_1, h_2, \ldots, h_k]_p$ | $[t_{act}^{train}, t_{act}^{val}, t_{act}^{test}]_p$ |

In some examples, the set of parameters (M) includes the following example parameters:

TABLE 3

Example ML Model Parameters

Number of Trainable Parameters
Total Number of Parameters
Optimization Algorithm
Learning Rate
Batch Size
Number of Unique Layers
Number of Different Layers
Avg Number of Units/Cells/Neurons Per Each Unique Layer In some examples, the set of heuristics (H) includes the following example heuristics:

TABLE 4

Example Training Data Heuristics

Number of Numerical Features
Number of Categorical Features
Number of Textual Features
Mean per Numerical Features
Median per Numerical Features
Number of Unique Categories Per Categorial Feature
Average Length of Text Per Textual Feature
Number of Unique Tokens in Textual Features
Total Number of Records in Training Data
Number of Records in Training Sub-Set
Number of Records in Validation Sub-Set
Number of Records in Testing Sub-Set In some examples, heuristics are determined based on field types provided for respective fields (e.g., columns) in the training data. For example, a number of numerical features in the training data is determined as the number of fields having a data type of numerical, a number of categorical features in the training data is determined as the number of fields having a data type of category, and a number of textual features in the training data is determined as the number of fields having a data type of text. In the example of FIG. 3, the number of numerical fields can be provided as four (4) (e.g., the bank statement ID field, the amount field, the document #field, the amount field), the number of categorical fields can be provided as four (4) (e.g., the company code field, the currency field, the company code field, the currency field), and the number of textual features can be provided as three (3) (e.g., the partner name field, the note field, the organization field).

In some examples, heuristics are determined based on values of records in respective fields. For example, the average value of numerical features in the training data can be determined by averaging all of the numerical values in the training data. In some examples, averages can be determined for respective fields. For example, and with reference to FIG. 3, an average for bank statement ID, an average for amount, an average for document #, an average for amount can be determined. As another example, the number of unique categories in the training data can be determined by counting the unique categories in each category field. For example, and with reference to FIG. 3, the number of unique categories can be provided as four (4) (e.g., CC1, CC2, EUR, USD). As another example, an average length of text in the training data can be determined by determining a number of characters in each token (word) in text and calculating the average number of characters. As another example, a number of unique tokens in text of the training data can be determined by grouping tokens (words) into clusters based on similarity (e.g. the same words are included in the same cluster) and providing the number of unique tokens as the number of clusters.

In some implementations, system parameters can be considered. Example system parameters can include, without limitation, processor type (e.g., CPU, GPU), processor computational speed, container memory, container space, and system memory. Accordingly, the historical training data can include data representative of the systems (e.g., servers, software) used to execute the training.

In accordance with implementations of the present disclosure, a training heuristics model is generated using the data representative of training pipeline executions from the database of historical training pipeline executions (e.g., Table 3). In some examples, the training heuristics model models actual training time ($t_{act}^{train}$), actual validation time ($t_{act}^{val}$), and actual testing time ($t_{act}^{test}$) of previously executed training pipelines in view of respective sets of parameters and respective sets of heuristics. In some examples, the training heuristics model is agnostic to ML models. That is, for example, the data used to generate the training heuristics model is representative of historical training pipeline executions for multiple types and variations of ML models.

In some examples, the training heuristics model is agnostic to enterprises that use the ML platform. For example, and as described above, the ML platform can be provided as a service to multiple enterprises, each enterprise having one or more ML models that are specific to the respective enterprise and that are trained using training data that is specific to the respective enterprise. Consequently, the data representative of training pipeline executions stored within the ML platform is representative of multiple enterprises. Accordingly, the training heuristics model that results from such data is not specific to any particular enterprise. That is, the training heuristics model is enterprise-agnostic.

In some implementations, the training heuristics model is provided as a regression model. In general, regression models model relationships between dependent variables and independent variables. In some examples, the training heuristics model is provided as a polynomial regression model (e.g., having n degrees). In the context of the present disclosure, the training heuristics model models the relationship between the set of actual execution times (as dependent variables) and the set of parameters and/or the set of heuristics (as independent variables).

In some implementations, the training heuristics model is provided by collecting the database of historical trainings and using a processing library to generate the training heuristics model. An example processing library can include, without limitation, sci-kitlearn. In some examples, the processing library generates a pipeline to dynamically select a number of degrees for polynomial regression. The following listing provides an example code snippet for generating the training heuristics model:

```
poly_features=Polynomialfeatures ( )
linear=LinearRegression ( )
regression_pipeline=Pipeline ([
    ('polynomial_features', poly_features),
    ('regression', linear)
])
param_grid=
    {'polynomial_features_degree': range (1, 11)
}
folds=KFold    (n_splits=3,    shuffle=True,    random_state=42)
model_cv=GridSearchCV (regression_pipeline,
    param_grid=param_grid,
    scoring='neg mean squared_error',
    cv=folds,
    verbose=1,
    return_train_score=True,
    n_jobs=−1)
model_cv. fit (x_train, y_train)
```
Listing 1: Example Code Snippet As depicted in the example of Listing 1, polynomial features and a regression model are initialized, a pipeline is provided, a parameters grid for searching boundaries of the polynomial degree are created, and, using grid search cross validation, the polynomial degree that produces the best fit model is identified.

In some implementations, and as described in further detail herein, the training heuristics model is stored in the ML platform and is selectively queried to determine a set of time estimates ($T^{EST}$) for a ML model that is to be trained through the training pipeline. In some examples, the training heuristics model is updated after the ML model is trained based on the actual execution times of the training pipeline. For example, a set of actual execution times ($T^{ACT}$) for the ML model can be added to the database of historical training pipeline executions and can be used to update the training heuristics model. In some examples, the training heuristics model is updated in response to receiving a set of actual execution times ($T^{ACT}$). In some examples, the training heuristics model is updated in response to receiving a threshold number of sets of actual execution times ($T^{ACT}$). In some examples, the training heuristics model is periodically updated (e.g., each X day(s), week(s), month(s)).

In accordance with implementations of the present disclosure, a status estimate is provided for each phase of the training pipeline. In some examples, each status estimate represents a percentage of a respective phase that has been completed. In further detail, a set of status estimates ($S^{EST}$) is provided and includes a status estimate for each phase of the training pipeline. That is, for example, a training status estimate ($s_{est}^{train}$), a validation status estimate ($s_{est}^{val}$), and a testing status estimate ($s_{est}^{test}$) are provided in the set of status estimates ($S^{EST}$)(e.g., $S^{EST}=\{s_{est}^{train}, s_{est}^{val}, s_{est}^{test}\}$). In some examples, each status estimate is set to a minimum value (e.g., 0%) at before the respective phase begins and is incremented as the respective phase progresses. Each status estimate is set to a maximum value (e.g., 100%) at completion of the respective phase.

In some implementations, the training status estimate is provided based on a number of epochs that are to be executed for the training phase. In some examples, the number of epochs is provided for in a training job. The training status estimate is incremented from the minimum value as epochs are executed. For example, and without limitation, a training job can provide that 40 epochs are to be executed for a ML model during the training phase. Prior to beginning the training phase, the training status estimate is set to 0%. In this example, as each epoch (each iteration of training) is executed, the training status estimate is increased by 2.5% (i.e., 1/40=0.025). Consequently, and in this example, after a first epoch is executed, the training status estimate is provided as 2.5%, after a second epoch is executed, the training status estimate is provided as 5.0%, after a third epoch is executed, the training status estimate is provided as 7.5%, and so on until, after a fortieth epoch is executed, the training status estimate is provided as 100%.

In some implementations, the validation status estimate is provided based on a number of records of validation data (validation sub-set) that are to be processed through the (trained) ML model for the validation phase. In some examples, the number of records is provided for in the training job. The validation status estimate is incremented from the minimum value as records are processed. For example, and without limitation, a training job can provide that 5000 records are to be processed using the ML model during the validation phase. Prior to beginning the validation phase, the validation status estimate is set to 0%. In this example, as each record is processed, the validation status estimate is increased by 0.02% (i.e., 1/5000=0.0002). Consequently, and in this example, after a first record is processed, the validation status estimate is provided as 0.02%, after a second record is processed, the validation status estimate is provided as 0.04%, after a third record is processed, the validation status estimate is provided as 0.06%, and so on until, after a five thousandth record is processed, the validation status estimate is provided as 100%.

In some implementations, the testing status estimate is provided based on a number of records of testing data (testing sub-set) that are to be processed through the (trained) ML model for the testing phase. In some examples, the number of records is provided for in the training job. The testing status estimate is incremented from the minimum value as records are processed. For example, and without limitation, a training job can provide that 3000 records are to be processed using the ML model during the testing phase. Prior to beginning the testing phase, the testing status estimate is set to 0%. In this example, as each record is processed, the testing status estimate is increased by 0.033% (i.e., 1/3000=0.00033). Consequently, and in this example, after a first record is processed, the testing status estimate is provided as 0.033%, after a second record is processed, the testing status estimate is provided as 0.066%, after a third record is processed, the testing status estimate is provided as 0.099%, and so on until, after a three thousandth record is processed, the testing status estimate is provided as 100%.

Figure 4:
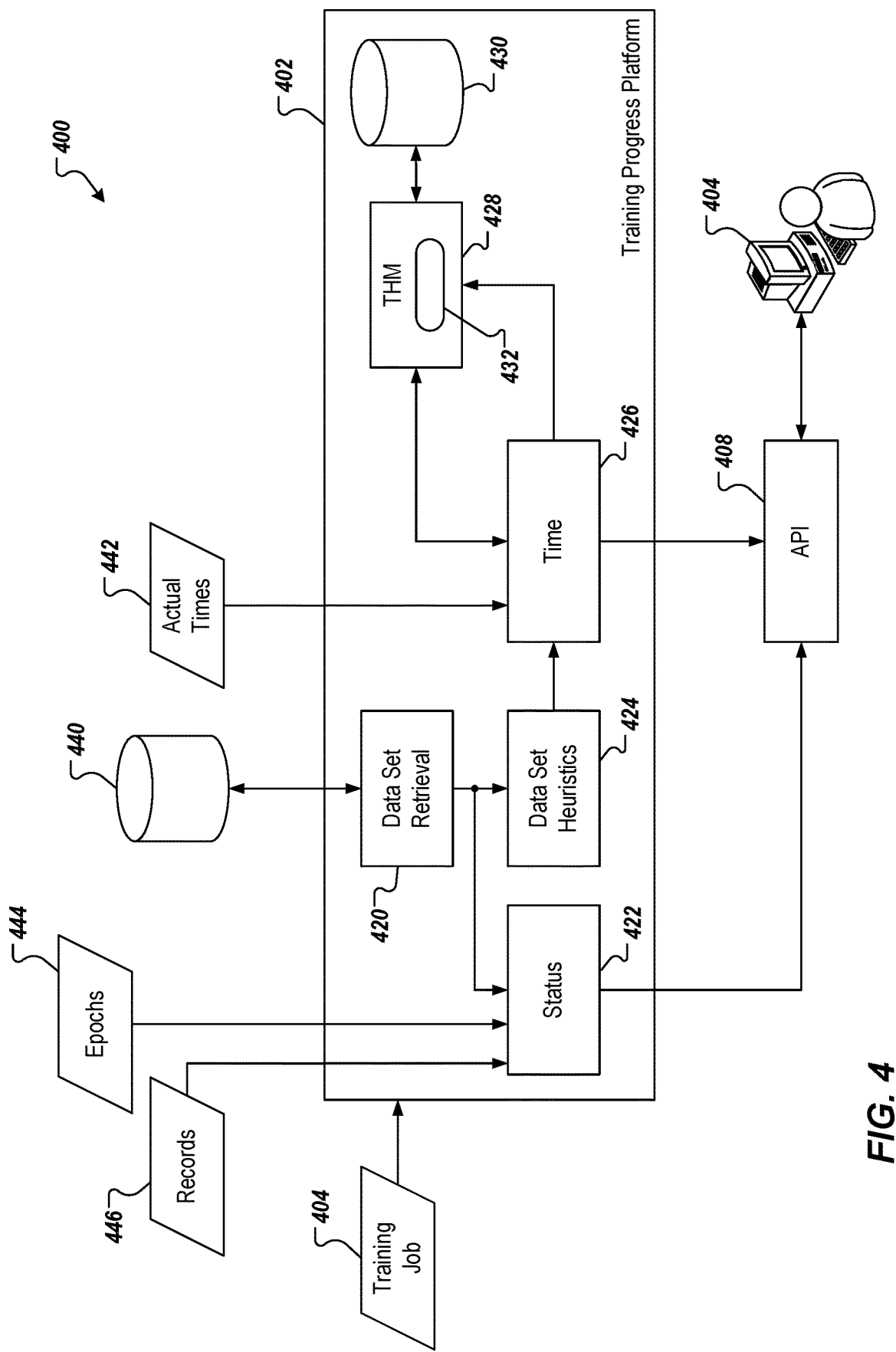
FIG. 4 depicts an example conceptual architecture in accordance with implementations of the present disclosure.

FIG. 4 depicts an example conceptual architecture 400 in accordance with implementations of the present disclosure. In some examples, the conceptual architecture 400 can interact with and/or be part of the cloud platform 206 of FIG. 2 (e.g., interact with and/or be part of the ML system 248).

In the example of FIG. 4, the conceptual architecture 400 includes a training progress platform 402 that provides training progress information representative of progress of processing of training job data 404 for an ML model through a training pipeline. For example, the training progress platform 402 determines time estimates and status estimates for each phase of a training pipeline, as described herein. In some examples, the training progress platform 402 provides the time estimates and status estimates for display on a computing device 406 through an application programming interface (API) 408.

In the depicted example, the training progress platform 402 includes a status module 422, a data set heuristics module 424, a time module 426, a training heuristics model (THM) module 428, and a database 430. In some examples, the database 430 stores data representative of historical training pipeline executions. In some examples, the THM module 428 provides and updates a THM 432, as described herein.

In some implementations, the training progress platform 402 receives at least a portion of the training job 404. In some examples, the training job data 404 includes a ML model identifier (model ID) that uniquely identifies a ML model that is to be trained through the training pipeline (e.g., by the ML system 248 of FIG. 2). In some examples, the data set retrieval module 420 retrieves the training data that is to be used to train the ML model through the training pipeline. For example, the data set retrieval module 420 requests the training data from a database 440 that stores the training data. In some examples, the data set retrieval module 420 provides the training data to the status module 422 and the data set heuristics module 424.

In some implementations, the status module 422 determines increment values for each of the training phase, the validation phase, and the testing phase based on epoch data and the training data. For example, the epoch data can be provided with the training job data 404 and can indicate a number of epochs that are to be executed during the training phase of the training pipeline. In some examples, the training data is provided in sub-sets, namely, a training sub-set, a validation sub-set, and a testing sub-set, each sub-set having a respective number of records therein. The status module 422 determines the increment value for the training phase by dividing one (1) by the number of epochs (e.g., 1/40=0.025). The status module 422 determines the increment value for the validation phase by dividing one (1) by the number of records in the validation sub-set (e.g., 1/5000=0.0002). The status module 422 determines the increment value for the testing phase by dividing one (1) by the number of records in the testing sub-set (e.g., 1/3000=0.00033). Prior to the onset of training, the status module 422 can make status estimates, each set to a minimum value, available for display through the API 408.

In some implementations, the data set heuristics module 424 determines a set of heuristics for the training data. For example, the data heuristics module 424 determines one or more of the example heuristics of Table 4.

In some implementations, the time module 426 determines a set of time estimates for the ML model that is to be processed based on the set of heuristics provided from the data set heuristics module 424 and a set of parameters associated with the ML model. In some examples, the set of parameters is provided within the training job data 404 and/or is retrieved based on the model ID. In some examples, the set of parameters includes one or more of the example parameters of Table 3. In some implementations, the time module 426 accesses the THM 432 and provides the set of parameters and the set of heuristics as input to the THM 432. In some examples, the THM 432 provides the set of time estimates as output. Prior to training beginning, the time module 426 can make the set of time estimates available for display through the API 408.

In some implementations, during processing of the ML model through the training pipeline, the time module 426 receives actual time data 442, which indicates a set of actual times that includes, for each phase, an actual time that has elapsed since the phase began. For example, the actual time data 442 can be provided from the ML platform that is processing the ML model through the training pipeline. In some examples, the time module 426 can make the set of actual times available for display through the API 408.

In some implementations, during processing of the ML model through the training pipeline, the status module 422 receives epochs data 444 and records data 446, which respectively indicate a number of epochs that have been executed for the training phase and a number of records that have been processed for each of the validation phase and the testing phase. In some examples, the status module 422 updates the status estimates for each of the phases based on the epochs data 444 or the records data 446. For example, the status module 422 can increment the training status estimate by an increment for each epoch that is executed, as described herein (e.g., if 4 epochs have been executed, increment the training status estimate by 4 increments from the minimum value). As another example, the status module 422 can increment the validation status estimate by an increment for each record in the validation sub-set that is processed, as described herein (e.g., if 10 records have been executed, increment the validation status estimate by 10 increments from the minimum value). As still another example, the status module 422 can increment the testing status estimate by an increment for each record in the testing sub-set that is processed, as described herein (e.g., if 15 records have been executed, increment the testing status estimate by 15 increments from the minimum value). In some examples, the status module 422 can make the status estimates available for display through the API 408.

After completion of processing of the ML model through the training pipeline, the time module 426 can provide a set of actual times to the THM module 428 for storage in the database 430. The set of actual times provides, for each phase, the actual time expended to complete the phase. In some implementations, the THM module 428 can selectively update the THM 432 based on the set of actual times. For example, the THM module 428 can update the THM 432 in response to receiving the set of actual execution times, in response to receiving a threshold number of sets of actual execution times, and/or periodically (e.g., each X day(s), week(s), month(s)), as described herein.

FIGS. 5A-5C depict portions of an example dashboard 500 in accordance with implementations of the present disclosure. As described in further detail herein, the dashboard 500 displays progress indicators to inform on the progress of processing a ML model through a training pipeline. FIGS. 5A-5C depict example units of measurement (e.g., hours (h), minutes (m), seconds(s), percentage). However, it is contemplated that any appropriate unit can be used.

In the example of FIG. 5A, the dashboard 500 depicts a scenario prior to onset of processing a ML model through a training pipeline. In FIG. 5A, it is seen that a set of time estimates has been provided for the ML model, as described herein. In the example of FIG. 5B, the dashboard 500 depicts a scenario in which the training phase has completed and validation is ongoing. In the example of FIG. 5C, the dashboard 500 depicts a scenario in which the training phase and the validation phase have completed and testing is ongoing.

Figure 6:
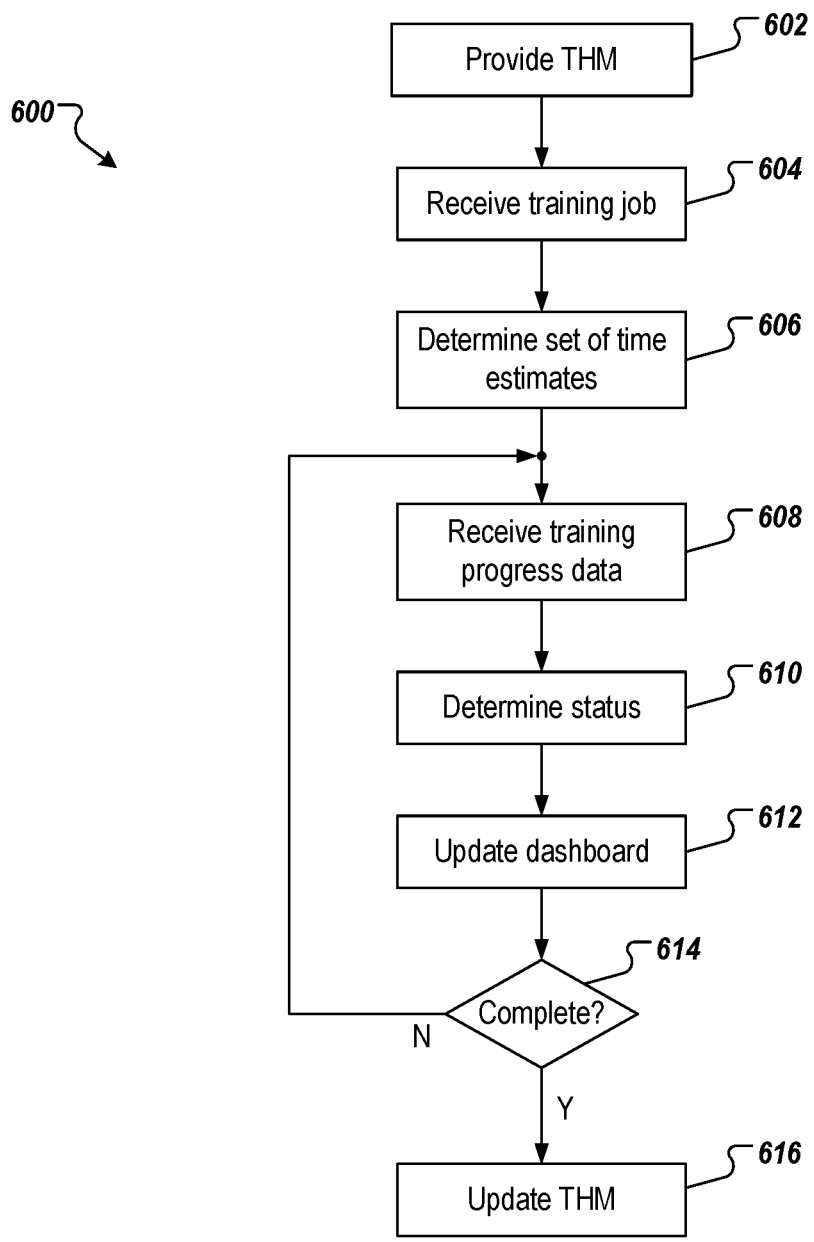
FIG. 6 depicts an example process that can be executed in accordance with implementations of the present disclosure.

FIG. 6 depicts an example process 600 that can be executed in accordance with implementations of the present disclosure. In some examples, the example process 600 is provided using one or more computer-executable programs executed by one or more computing devices.

A training heuristics model (THM) is provided (602). For example, and as described herein, the THM module 428 of FIG. 4 processes data representative of training pipeline executions through a regression analysis to provide the THM 432 as a polynomial regression model. In some examples, the data includes, for each training pipeline execution, a set of parameters associated with a ML model that was trained, a set of heuristics of the training data used to train the ML model through the training pipeline, and a set of actual times indicating, for each phase, an actual time spent processing the ML model.

Training job data is received (604). For example, and as described herein, training job data 404 is received in response to initiating training of a ML model. In some examples, the training job data 404 includes a model ID that uniquely identifies the ML model that is to be trained through a training pipeline. In some examples, the model ID can be used to request data representative of the ML model (e.g., a set of parameters) and training data that is to be used during processing of the ML model through the training pipeline.

A set of time estimates is determined (606). For example, and as described herein, the data set heuristics module 422 determines a set of heuristics for the ML model based on the training data that is to be used during processing of the ML model through the training pipeline. For example, the data set heuristics module 422 processes the training data to determine the set of heuristics including one or more of the example heuristics of Table 4. The set of heuristics is provided to the time module 426. In some examples, the time module 426 determines a set of time estimates for the ML model that is to be processed based on the set of heuristics provided from the data set heuristics module 424 and a set of parameters associated with the ML model. In some examples, the set of parameters is provided within the training job data 404 and/or is retrieved based on the model ID. In some examples, the set of parameters includes one or more of the example parameters of Table 3. In some examples, the time module 426 accesses the THM 432 and provides the set of parameters and the set of heuristics as input to the THM 432, which provides the set of time estimates as output. Prior to training beginning, the time module 426 can make the set of time estimates available for display through the API 408.

Training progress data is received (608). For example, and as described herein, the time module 426 receives actual time data 442 and the status module 422 receives epochs data 444 and records data 446. Status is determined (610). For example, and as described herein, the status module 422 can increment the training status estimate by an increment for each epoch that is executed, can increment the validation status estimate by an increment for each record in the validation sub-set that is processed, and can increment the testing status estimate by an increment for each record in the testing sub-set that is processed. A dashboard is updated (612). For example, and as described herein, the status module 422 can make the status estimates available for display through the API 408 and the time module 426 can make the actual times available for display through the API 408.

It is determined whether the training pipeline is complete (614). For example, and as described herein, the ML platform that processes the ML model through the training pipeline can provide an indication to the training progress platform 402 that the training pipeline is complete. If the indication has been received, it is determined that the training pipeline is compete. If the training pipeline is not complete, the example process 600 loops back. If the training pipeline is complete, the THM is updated (616). For example, and as described herein, the time module 426 can provide a set of actual times to the THM module 428 for storage in the database 430. The set of actual times provides, for each phase, the actual time expended to complete the phase. In some implementations, the THM module 428 can selectively update the THM 432 based on the set of actual times. For example, the THM module 428 can update the THM 432 in response to receiving the set of actual execution times, in response to receiving a threshold number of sets of actual execution times, and/or periodically (e.g., each X day(s), week(s), month(s)), as described herein.

Figure 7:
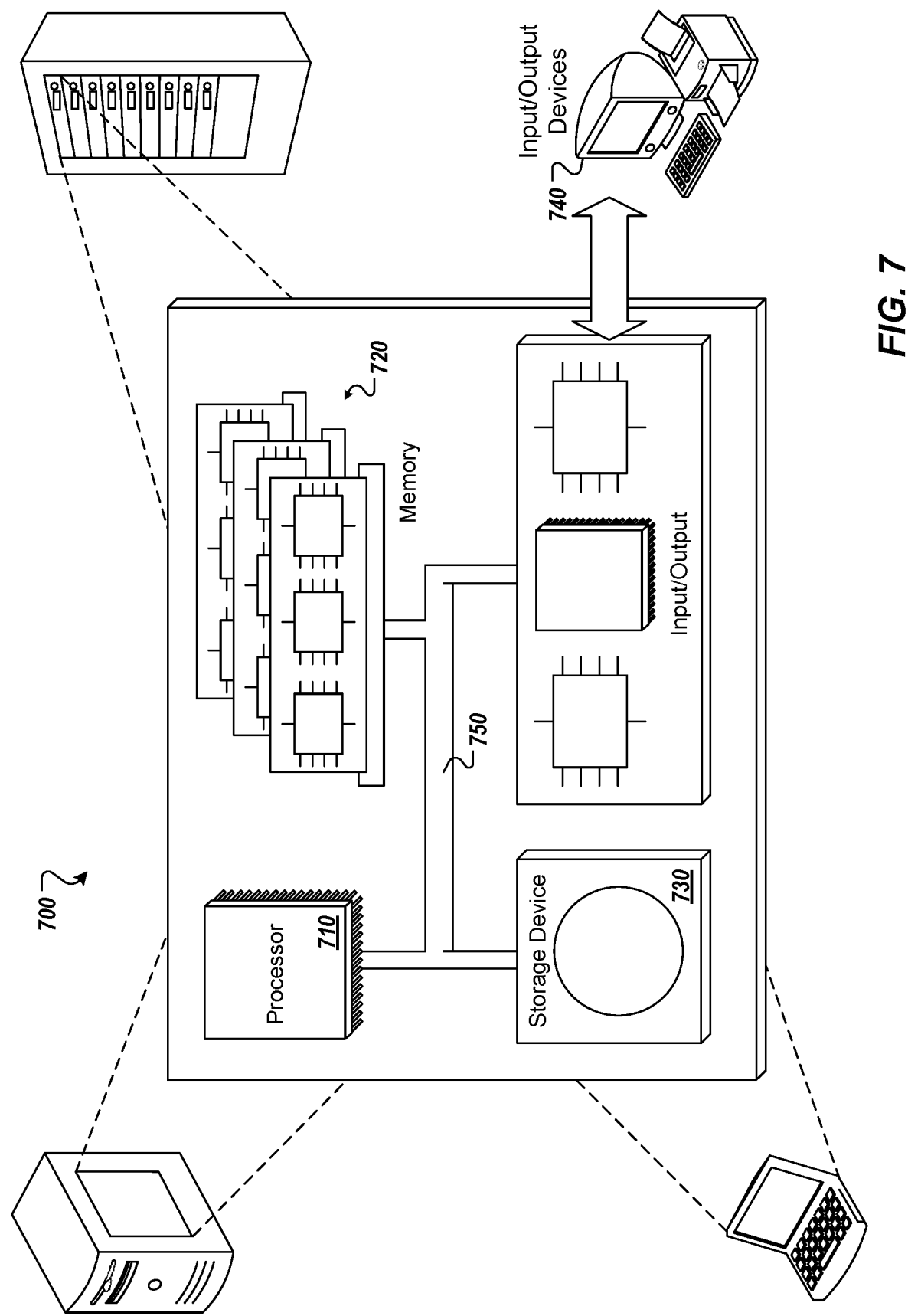
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In some implementations, the memory 720 is a volatile memory unit. In some implementations, the memory 720 is a non-volatile memory unit. The storage device 730 is capable of providing mass storage for the system 700. In some implementations, the storage device 730 is a computer-readable medium. In some implementations, the storage device 730 may be a floppy disk device, a hard disk device, an optical disk device, or a tape device. The input/output device 740 provides input/output operations for the system 700. In some implementations, the input/output device 740 includes a keyboard and/or pointing device. In some implementations, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for training a machine learning (ML) model, the method being executed by one or more processors and comprising:
   training a training heuristics model to predict time estimates for each of a training phase, a validation phase, and a test phase of a training pipeline for training ML models, the training heuristics model trained using training data that is representative of previously executed training of multiple types and variations of ML models, such that the training heuristics model is agnostic to any particular ML model;
   providing a set of heuristics representative of training data that is to be used to process the ML model through the training pipeline;
   determining a set of time estimates by providing the set of heuristics as input to a training heuristics model that provides the set of time estimates as output, each time estimate in the set of time estimates indicating an estimated duration of a respective phase of the training pipeline;
   receiving, during processing of the ML model through the training pipeline, progress data representative of a progress of processing of the ML model;
   determining a set of status estimates comprising a status estimate for each phase of the training pipeline based on the progress data; and
   transmitting the set of time estimates and the set of status estimates for display.

2. The method of claim 1, wherein determining a set of status estimates at least partially comprises calculating a training status estimate as a product of an epoch increment counter and a number of executed epochs, the epoch increment counter being provided based on a number of epochs to be executed during a training phase of the training pipeline.

3. The method of claim 1, wherein determining a set of status estimates at least partially comprises calculating a validation status estimate as a product of a validation increment counter and a number of processed records, the validation increment counter being provided based on a number of records to be processed during a validation phase of the training pipeline.

4. The method of claim 1, wherein determining a set of status estimates at least partially comprises calculating a testing status estimate as a product of a testing increment counter and a number of processed records, the testing increment counter being provided based on a number of records to be processed during a testing phase of the training pipeline.

5. The method of claim 1, wherein providing a set of heuristics comprises one or more of:
   determining a number of numerical features in the training data;
   determining a number of categorical features in the training data;
   determining a number of textual features in the training data;
   determining an average value of numerical features in the training data;
   determining a number of unique categories in the training data;
   determining an average length of text in the training data;
   determining a number of unique tokens in text of the training data;
   determining a number of records in the training data;
   determining a number of records in a training sub-set of the training data;
   determining a number of records in a validation sub-set of the training data; and
   determining a number of records in a testing sub-set of the training data.

6. The method of claim 1, wherein the training heuristics model is agnostic to the ML model.

7. The method of claim 1, wherein the training heuristics model comprises a polynomial regression model that is generated based on historical data comprising sets of heuristics and respective sets of estimated training times.

8. A non-transitory computer-readable storage medium coupled to one or more processors and having instructions stored thereon which, when executed by the one or more processors, cause the one or more processors to perform operations for training a machine learning (ML) model, the operations comprising:
   training a training heuristics model to predict time estimates for each of a training phase, a validation phase, and a test phase of a training pipeline for training ML models, the training heuristics model trained using training data that is representative of previously executed training of multiple types and variations of ML models, such that the training heuristics model is agnostic to any particular ML model;
   providing a set of heuristics representative of training data that is to be used to process the ML model through the training pipeline;
   determining a set of time estimates by providing the set of heuristics as input to a training heuristics model that provides the set of time estimates as output, each time estimate in the set of time estimates indicating an estimated duration of a respective phase of the training pipeline;
   receiving, during processing of the ML model through the training pipeline, progress data representative of a progress of processing of the ML model;
   determining a set of status estimates comprising a status estimate for each phase of the training pipeline based on the progress data; and
   transmitting the set of time estimates and the set of status estimates for display.

9. The non-transitory computer-readable storage medium of claim 8, wherein determining a set of status estimates at least partially comprises calculating a training status estimate as a product of an epoch increment counter and a number of executed epochs, the epoch increment counter being provided based on a number of epochs to be executed during a training phase of the training pipeline.

10. The non-transitory computer-readable storage medium of claim 8, wherein determining a set of status estimates at least partially comprises calculating a validation status estimate as a product of a validation increment counter and a number of processed records, the validation increment counter being provided based on a number of records to be processed during a validation phase of the training pipeline.

11. The non-transitory computer-readable storage medium of claim 8, wherein determining a set of status estimates at least partially comprises calculating a testing status estimate as a product of a testing increment counter and a number of processed records, the testing increment counter being provided based on a number of records to be processed during a testing phase of the training pipeline.

12. The non-transitory computer-readable storage medium of claim 8, wherein providing a set of heuristics comprises one or more of:
   determining a number of numerical features in the training data;
   determining a number of categorical features in the training data;
   determining a number of textual features in the training data;
   determining an average value of numerical features in the training data;
   determining a number of unique categories in the training data;
   determining an average length of text in the training data;
   determining a number of unique tokens in text of the training data;
   determining a number of records in the training data;
   determining a number of records in a training sub-set of the training data;
   determining a number of records in a validation sub-set of the training data; and
   determining a number of records in a testing sub-set of the training data.

13. The non-transitory computer-readable storage medium of claim 8, wherein the training heuristics model is agnostic to the ML model.

14. The non-transitory computer-readable storage medium of claim 8, wherein the training heuristics model comprises a polynomial regression model that is generated based on historical data comprising sets of heuristics and respective sets of estimated training times.

15. A system, comprising:
   a computing device; and
   a computer-readable storage device coupled to the computing device and having instructions stored thereon which, when executed by the computing device, cause the computing device to perform operations for training a machine learning (ML) model, the operations comprising:
      training a training heuristics model to predict time estimates for each of a training phase, a validation phase, and a test phase of a training pipeline for training ML models, the training heuristics model trained using training data that is representative of previously executed training of multiple types and variations of ML models, such that the training heuristics model is agnostic to any particular ML model;
      providing a set of heuristics representative of training data that is to be used to process the ML model through the training pipeline;
      determining a set of time estimates by providing the set of heuristics as input to a training heuristics model that provides the set of time estimates as output, each time estimate in the set of time estimates indicating an estimated duration of a respective phase of the training pipeline;
      receiving, during processing of the ML model through the training pipeline, progress data representative of a progress of processing of the ML model;
      determining a set of status estimates comprising a status estimate for each phase of the training pipeline based on the progress data; and
      transmitting the set of time estimates and the set of status estimates for display.

16. The system of claim 15, wherein determining a set of status estimates at least partially comprises calculating a training status estimate as a product of an epoch increment counter and a number of executed epochs, the epoch increment counter being provided based on a number of epochs to be executed during a training phase of the training pipeline.

17. The system of claim 15, wherein determining a set of status estimates at least partially comprises calculating a validation status estimate as a product of a validation increment counter and a number of processed records, the validation increment counter being provided based on a number of records to be processed during a validation phase of the training pipeline.

18. The system of claim 15, wherein determining a set of status estimates at least partially comprises calculating a testing status estimate as a product of a testing increment counter and a number of processed records, the testing increment counter being provided based on a number of records to be processed during a testing phase of the training pipeline.

19. The system of claim 15, wherein providing a set of heuristics comprises one or more of:
   determining a number of numerical features in the training data;
   determining a number of categorical features in the training data;
   determining a number of textual features in the training data;
   determining an average value of numerical features in the training data;
   determining a number of unique categories in the training data;
   determining an average length of text in the training data;
   determining a number of unique tokens in text of the training data;
   determining a number of records in the training data;
   determining a number of records in a training sub-set of the training data;
   determining a number of records in a validation sub-set of the training data; and
   determining a number of records in a testing sub-set of the training data.

20. The system of claim 15, wherein the training heuristics model is agnostic to the ML model.

\* \* \* \* \*